United States Patent
Kakadia et al.

(10) Patent No.: US 10,686,723 B2
(45) Date of Patent: Jun. 16, 2020

(54) PROVIDING QUALITY OF SERVICE BASED ON BANDWIDTH

(71) Applicants: Verizon Patent and Licensing Inc., Arlington, VA (US); Cellco Partnership, Arlington, VA (US)

(72) Inventors: Deepak Kakadia, Antioch, CA (US); Donna L. Polehn, Kirkland, WA (US); Lalit R. Kotecha, San Ramon, CA (US); Priscilla Lau, Fremont, CA (US); David Chiang, Fremont, CA (US); Arda Aksu, Martinez, CA (US); Maria G. Lam, Oakland, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 69 days.

(21) Appl. No.: 15/710,456

(22) Filed: Sep. 20, 2017

(65) Prior Publication Data
US 2018/0013695 A1 Jan. 11, 2018

Related U.S. Application Data

(63) Continuation of application No. 14/158,061, filed on Jan. 17, 2014, now Pat. No. 9,807,029.

(51) Int. Cl.
*H04L 12/911* (2013.01)
*H04L 12/927* (2013.01)
(Continued)

(52) U.S. Cl.
CPC .......... *H04L 47/803* (2013.01); *H04L 47/824* (2013.01); *H04W 28/24* (2013.01); *H04W 28/20* (2013.01)

(58) Field of Classification Search
CPC ......... H04W 28/0252; H04W 28/0268; H04W 28/24; H04W 72/048; H04W 28/20; H04L 47/803; H04L 47/20; H04L 47/824
See application file for complete search history.

(56) References Cited

U.S. PATENT DOCUMENTS 8,837,271 B1 * 9/2014 Mansour ................. H04J 13/18
370/208
2003/0202500 A1 * 10/2003 Ha ......................... H04L 1/0003
370/342
(Continued)

FOREIGN PATENT DOCUMENTS

WO  2003/075522     9/2003
WO  WO-03075522 A1 * 9/2003 ............. H04L 47/14

*Primary Examiner* — Un C Cho
*Assistant Examiner* — Peter K Mak

(57) ABSTRACT

A method for determining a Quality of Service (QoS) policy can be based on requested bandwidth. The method may initially receive a connection request which includes a requested bandwidth that corresponds to an application. The method may then determine a policy for an application data flow associated with the application based on the connection request. A bandwidth designation, which is based on the requested bandwidth, may be assigned to the application data flow based on the determined policy. Finally, the policy and the bandwidth designation may be provided so that a bearer can be assigned.

20 Claims, 10 Drawing Sheets

(51) Int. Cl.
*H04W 28/20* (2009.01)
*H04W 28/24* (2009.01)

(56) References Cited

U.S. PATENT DOCUMENTS

| | | |
|---|---|---|
| 2005/0250509 A1 | 11/2005 | Choksi |
| 2006/0246900 A1 | 11/2006 | Zheng |
| 2007/0097981 A1* | 5/2007 | Papasakellariou .... H04L 1/1854 370/394 |
| 2009/0190568 A1* | 7/2009 | Son ..................... H04W 72/048 370/346 |
| 2010/0020713 A1* | 1/2010 | Frankkila .............. H04L 47/193 370/252 |
| 2010/0234040 A1* | 9/2010 | Palanki ............... H04W 52/244 455/452.2 |
| 2010/0318670 A1 | 12/2010 | Al-Shalash et al. |
| 2011/0317557 A1 | 12/2011 | Siddam et al. |
| 2012/0106499 A1 | 5/2012 | Seo et al. |
| 2014/0029570 A1 | 1/2014 | Lee |
| 2015/0036654 A1* | 2/2015 | Sawai ................... H04L 1/0071 370/330 |
| 2015/0373721 A1* | 12/2015 | Zhang .................. H04L 5/0057 370/329 |

* cited by examiner

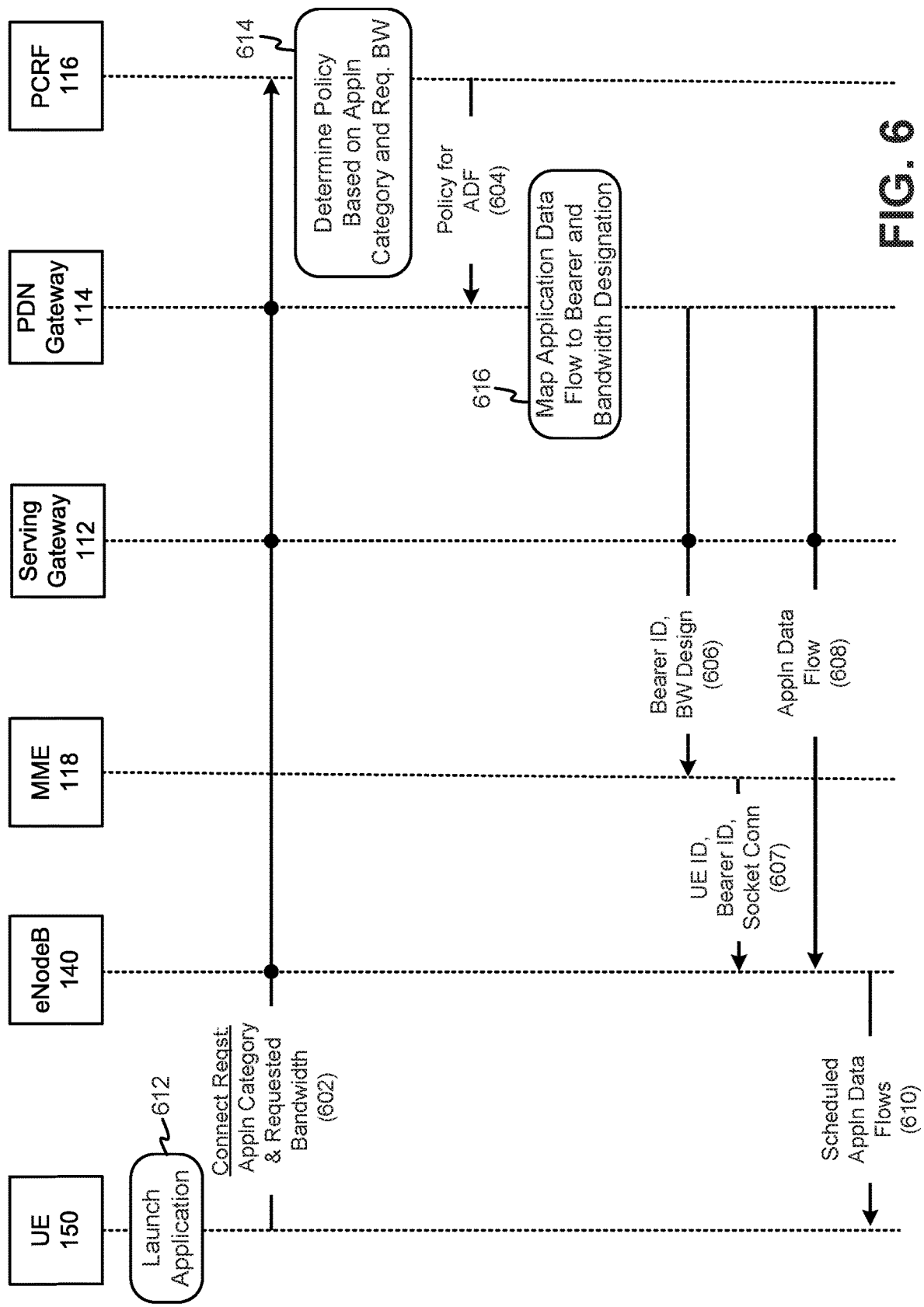

PROVIDING QUALITY OF SERVICE BASED ON BANDWIDTH

CROSS REFERENCE TO RELATED APPLICATIONS

This application is a continuation of application Ser. No. 14/158,061, filed Jan. 17, 2014, the contents of which are hereby incorporated herein by reference in its entirety.

BACKGROUND

Mobile wireless communication systems have finite resources which are typically shared among users and a variety of services. Different types of applications using these services can place varied demands on the wireless network. To address these demands, Quality of Service (QoS) techniques efficiently partition available network resources to provide sufficient service for all the applications. Conventional QoS techniques rely on relative priorities which are based on QoS Class Identifiers (QCIs) for scheduling packets. However, such techniques can result in inadequate bandwidth for some applications.

BRIEF DESCRIPTION OF THE DRAWINGS

FIG. 6 is a signal flow diagram depicting exemplary messages exchanged between networking elements;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to approaches for providing Quality of Service (QoS) which may be based on resources requested for an application, and/or wireless channel resources available to a mobile device that hosts the application. QoS prioritization for conventional non-Guaranteed Bit Rate (GBR) traffic may be based on relative priority specified using QoS Class Identifiers (QCIs). Using the QCI values, application data flows may be divided into different service categories based on their relative priority. Because the service categories only provide a coarse differentiation between their offered services, different applications having widely varying resource requirements may be placed into the same service category. As a result, within a given service category, some applications may not receive adequate resources for proper operation when "competing" with less resource intensive applications. For example, buffered video streaming and email can be classified under the same QCI, and thus receive the same level of service, even though buffered video streaming can require significantly more bandwidth than email.

Embodiments presented herein can address such discrepancies among different application data flows (which have the same QCI value) and thus provide finer granularity service differentiation among different applications for a given user. Alternate embodiments may offer finer granularity service differentiation among similar application data flows among separate users, wherein the separate users are associated with different wireless channel conditions. Thus, various embodiments are described below provide "application fairness," and thus may offer finer granularity service differentiation than existing QoS approaches.

Figure 1:
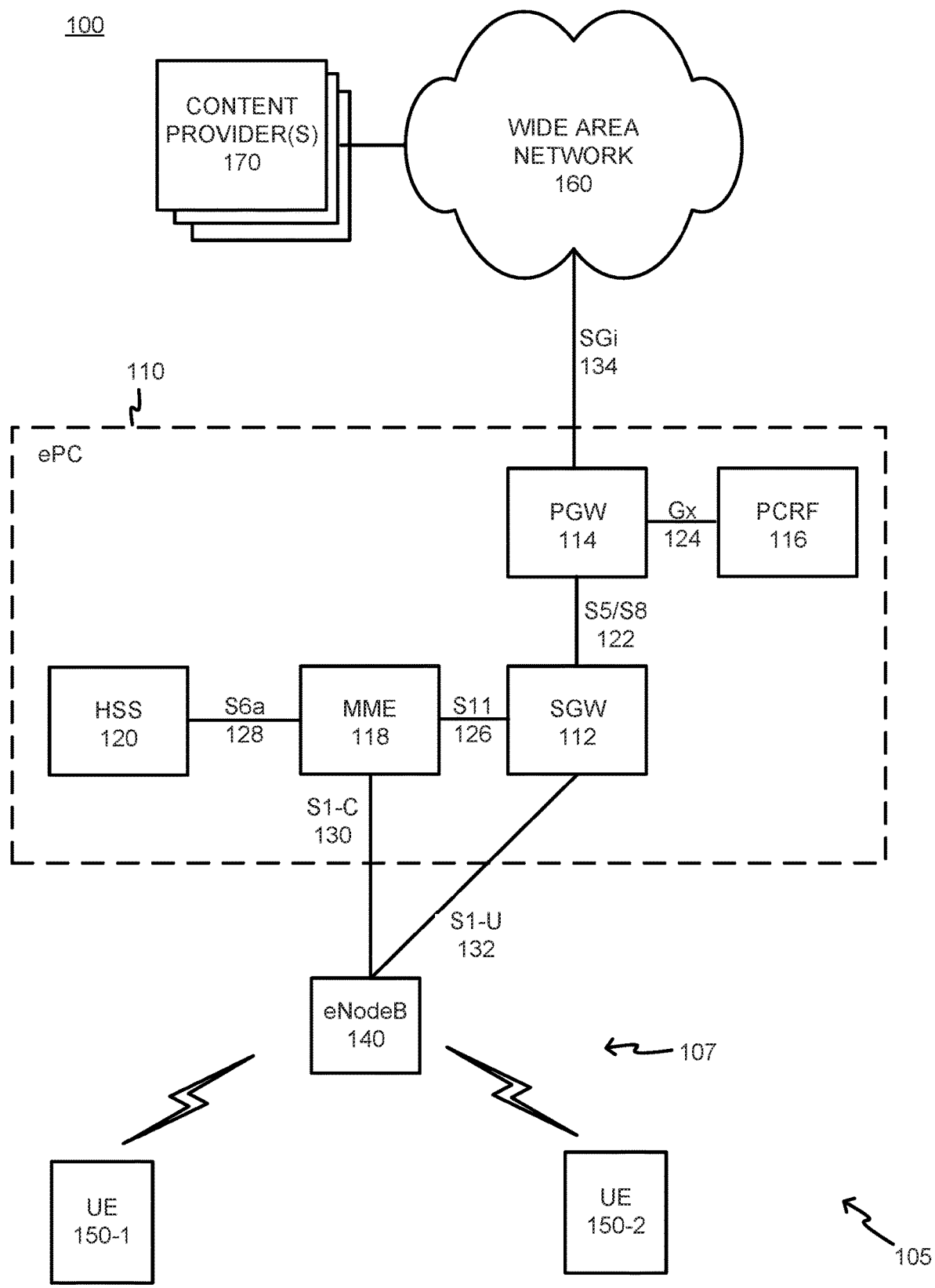
FIG. 1 is a block diagram of an exemplary network which may provide Quality of Service (QoS) based on application resource requirements.

FIG. 1 is a block diagram of an exemplary network 100 which may provide QoS based on application resource requirements such as bandwidth. Network 100 may include wireless network 105, Wide Area Network (WAN) 160, and content provider(s) 170. While wireless network 105 is shown in the context of an Long Term Evolution (LTE) network, it should be appreciated that embodiments presented herein may operate in any appropriate wireless network(s). Wireless network 105 may include one or more mobile devices, such as, for example, User Equipment (UEs) 150-1 and 150-2 (as used herein, collectively referred to as "UE 150" and individually as "UE 150-x"). Wireless network 105 may include an evolved Packet Core (ePC) 110, and an evolved Universal Mobile Telecommunications System (UMTS) Terrestrial Radio Access Network (eUTRAN) 107.

Wireless network 105 may further include one or more devices that are physical and/or logical entities interconnected via standardized interfaces. Wireless network 105 provides wireless packet-switched services and wireless IP connectivity to mobile devices to provide, for example, data, voice, and/or multimedia services. The ePC 110 may further include a mobility management entity (MME) 118, a serving gateway (SGW) device 112, a packet data network (PDN) gateway (PGW) 114, a Policy and Charging Rules Function (PCRF) 116, and a home subscriber server (HSS) 120. The eUTRAN 107 may further include one or base stations, such as, for example, eNodeBs 140. It is noted that FIG. 1 depicts a representative networking system 100 with exemplary components and configuration shown for purposes of explanation. Other embodiments may include additional or different network entities in alternative configurations than which are exemplified in FIG. 1.

Further referring to FIG. 1, each eNodeB 140 may include one or more devices and other components having functionality that allow UE 150 to wirelessly connect to eUTRAN 107. eNodeB 150 may interface with ePC 110 via a S1 interface, which may be split into a control plane S1-C interface 130 and a data plane S1-U interface 132. S1-C interface 130 may interface with MME device 118. S1-C interface 130 may be implemented, for example, with a protocol stack that includes a Network Access Server (NAS) protocol and/or Stream Control Transmission Protocol (SCTP). S1-U interface 132 may interface with SGW 112 and may be implemented, for example, using a General Packet Radio Service Tunneling Protocol version 2

(GTPv2). eNodeB 140 may communicate with other eNodeBs via an X2 interface (not shown). The X2 interface may be implemented, for example, with a protocol stack that includes an X2 application protocol and SCTP.

MME device 118 may implement control plane processing for wireless network 105. For example, MME device 118 may implement tracking and paging procedures for UE 150, may activate and deactivate bearers for UE 150, may authenticate a user of UE 150, and may interface to non-LTE radio access networks. A bearer may represent a logical channel with particular QoS requirements, as will be discussed in more detail below. MME device 118 may also select a particular SGW 112 for a particular UE 150. A particular MME device 118 may interface with other MME devices (not shown) in ePC 110 and may send and receive information associated with UEs, which may allow one MME device to take over control plane processing of UEs serviced by another MME device, if the other MME device becomes unavailable.

SGW 112 may provide an access point to and from UE 150, may handle forwarding of data packets for UE 150, and may act as a local anchor point during handover procedures between eNodeBs 140. SGW 112 may interface with PGW 114 through an S5/S8 interface 122. S5/S8 interface 122 may be implemented, for example, using GTPv2.

PGW 114 may function as a gateway to WAN 160 through a SGi interface 134. WAN 160 may include, for example, an IP Multimedia Subsystem (IMS) network, which may provide voice and multimedia services to UE 140, based on Session Initiation Protocol (SIP). A particular UE 150, while connected to a single SGW 112, may be connected to multiple PGWs 114, one for each packet network with which UE 150 communicates.

PCRF 116 provides policy control decision and flow based charging control functionalities. PCRF 116 may provide network control regarding service data flow detection, gating, QoS and flow based charging, etc. PCRF 116 may determine how a certain service data flow shall be treated, and may ensure that user plane traffic mapping and treatment is in accordance with a user's subscription profile. PCRF 116 may communicate with PGW 114 using a Gx interface 124. Gx interface 124 may be implemented, for example, using a Diameter protocol.

MME device 118 may communicate with SGW 112 through an S11 interface 126. S11 interface 126 may be implemented, for example, using GTPv2. S11 interface 126 may be used to create and manage a new session for a particular UE 150. S11 interface 126 may be activated when MME device 118 needs to communicate with SGW 112, such as when the particular UE 150 attaches to ePC 110, when bearers need to be added or modified for an existing session for the particular UE 150, when a connection to a new PGW 114 needs to created, or during a handover procedure (e.g., when the particular UE 150 needs to switch to a different SGW 112).

HSS device 120 may store information associated with UEs 150 and/or information associated with users of UEs 150. For example, HSS device 120 may store user profiles that include authentication and access authorization information. MME device 118 may communicate with HSS device 120 through an S6a interface 128. S6a interface 128 may be implemented, for example, using a Diameter protocol.

Content providers 170 may be hosted on any type of web server, media repository, streaming source, etc., that can provide UE 150 with content which is requested by the user. Content providers 170 may provide any form of media, text, audio, image, video, etc., which can be requested by the user through UE 150. Alternatively, content source may be, or provide a connection to, another communications provider (e.g., other wireless carrier, OTT service, etc.), and thus provide UE 150 with voice, text, and/or video communications with other users of network 100.

Wide Area Network 160 may include any type wired or wireless network covering larger areas. For example, WAN 160 may include a metropolitan area network (MAN), a Public Switched Telephone Network (PSTN), an ad hoc network, an intranet, the Internet, a fiber optic-based network, a wireless network, and/or a combination of these or other types of networks. WAN 160 may be an IP based network or utilize MultiProtocol Label Switching (MPLS), and may include a mesh network (e.g., IEEE 801.11s) and/or or a WiMAX IEEE 802.16. WAN 160 may include one or more circuit-switched networks and/or packet-switched networks.

Further referring to FIG. 1, multiple elements in ePC 110 perform various functions which for implementing QoS and policy management. As noted above, PCRF 116 may be the policy server in ePC 110. PCRF 116 may take the available network information and operator-configured policies to create service session-level policy decisions. The decisions, known as Policy and Charging Control (PCC) rules, are forwarded to a policy and charging enforcement function (PCEF) (not shown) located in PGW 114. The PCEF enforces policy decisions by establishing bearers, mapping service data flows to bearers, and performing traffic policing and shaping. In one example, PGW 114 maps bearers to the underlying transport network. The transport network will typically be Ethernet based, and may use MPLS. The transport may not be aware of the bearer concept and will use standard IP QoS techniques, such as DiffServ. ENodeB 140 plays a role in end-to-end QoS and policy enforcement, and performs uplink and downlink rate policing, as well as scheduling resource blocks which are transmitted over the wireless channel. EnodeB 140 may use Allocation and Retention Policy (ARP) when allocating bearer resources. The effectiveness of resource block scheduling algorithms in eNodeB's 140 can have a significant impact on service quality and overall network performance. UE 150 may also perform functionality which impacts policy in the uplink direction, as it performs the initial mapping of service data flows to bearers.

While FIG. 1 shows exemplary components of network 100, in other implementations, network 100 may include fewer components, different components, differently arranged components, or additional components than depicted in FIG. 1. Additionally or alternatively, one or more components of network 100 may perform functions described as being performed by one or more other components.

Figure 2:
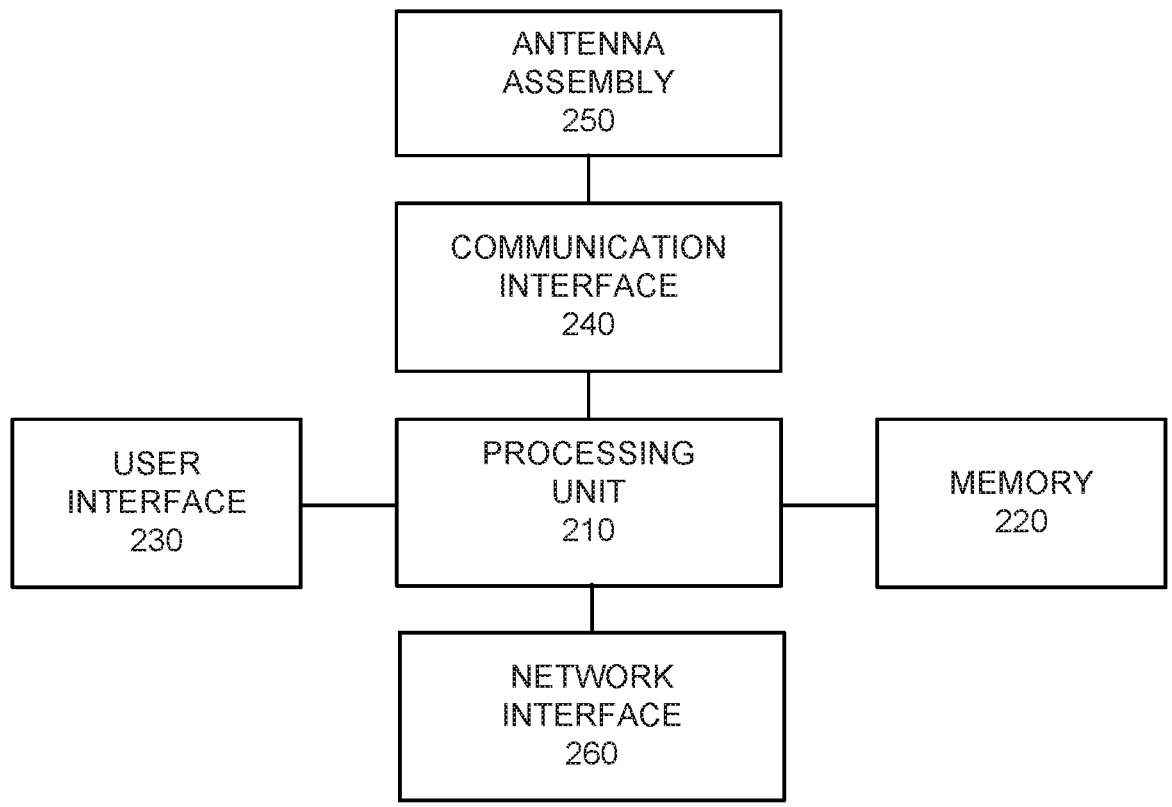
FIG. 2 is a block diagram showing exemplary components of a base station according to an embodiment.

FIG. 2 is a block diagram showing exemplary components of a base station 200 (e.g., eNodeB 140) according to an embodiment. As shown in FIG. 1, base station 200 may include a processing unit 210, a memory 220, a user interface 230, a communication interface 240, an antenna assembly 250, and a network interface 260.

Processing unit 210 may include one or more processors, microprocessors, application specific integrated circuits (ASICs), field programmable gate arrays (FPGAs), and/or other processing logic. Processing unit 210 may control operation of base station 200 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may include mechanisms for inputting information to base station 200 and/or for outputting information from base station 200. Examples of input and output mechanisms might include a speaker to receive electrical signals and output audio signals; a microphone to receive audio signals and output electrical signals; buttons (e.g., a joystick, control buttons, a keyboard, or keys of a keypad) and/or a touchscreen to permit data and control commands to be input into base station 200; a display, such as an Liquid Crystal Display (LCD), to output visual information; and/or any other type of input or output device. In some embodiments, base station 200 may be managed remotely and may not include user interface 230. In other words, base station 200 may be "headless" and may not include an input device and/or an output device.

Communication interface 240 may include one or more Radio Frequency (RF) transceivers that enable base station 200 to communicate with mobile devices via wireless communications. An RF transceiver may include an RF transmitter that receives signals to be transmitted wirelessly and performs signal processing on the signals before providing the signals to antenna assembly 250, and an RF receiver that receives signals from antenna assembly 250 and performs signal processing on the received signals before providing the received signals to processing unit 210. For example, the RF transceiver may perform analog-to-digital and digital-to-analog conversion, modulation and demodulation, up-conversion and down-conversion, and/or amplification of signals.

Antenna assembly 250 may include one or more antennas to transmit and/or receive RF signals over the air. Antenna assembly 250 may, for example, receive RF signals from communication interface 240 and transmit the signals over the air and receive RF signals over the air and provide them to communication interface 240.

Network interface 260 may include a logical component that includes input and/or output ports, input and/or output systems, and/or other input and output components that facilitate the transmission of data to other devices via a backhaul link. For example, network interface 260 may include a network interface card (e.g., Ethernet card) for wired communications and/or a wireless network interface (e.g., a WiFi) card for wireless communications. Network interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described herein, base station 200 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 2 shows example components of base station 200, in other implementations, base station 200 may include fewer components, different components, differently arranged components, or additional components than those depicted in FIG. 2. Additionally or alternatively, one or more components of base station 200 may perform the tasks described as being performed by one or more other components of base station 200.

Figure 3:
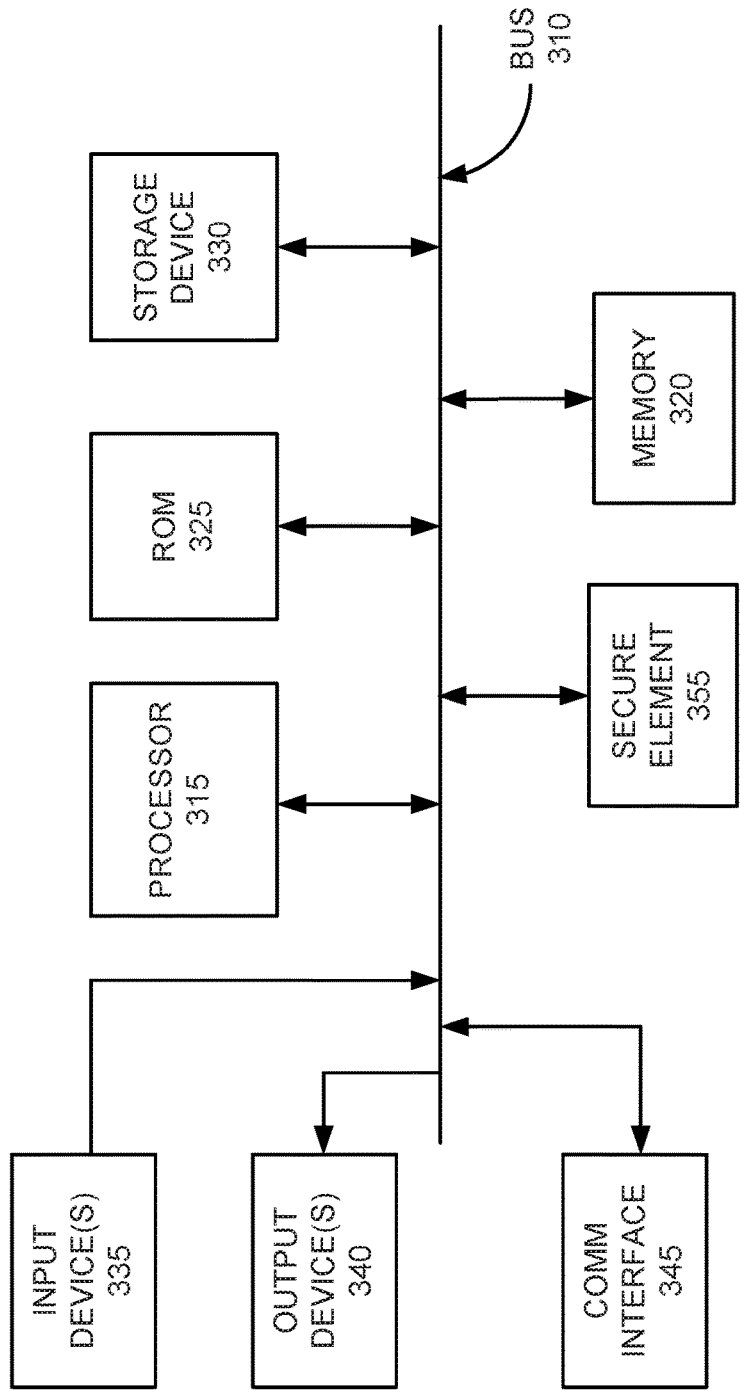
FIG. 3 is a block diagram showing exemplary components of a mobile device according to an embodiment.

FIG. 3 is a block diagram showing exemplary components of a mobile device 300 (e.g., UE 150) according to an embodiment. Mobile device 300 may include any mobile communication device configured to communicate with base station 200 via wireless signals. For example, mobile device 300 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a media playing device; a portable gaming system; and/or any type of mobile device with wireless communication capability.

Mobile device 300 may include a bus 310, a processor 315, memory 320, a read only memory (ROM) 325, a storage device 330, one or more input device(s) 335, one or more output device(s) 340, a communication interface 345, and Secure Element (SE) 355. Bus 310 may include a path that permits communication among the elements of mobile device 300.

Processor 315 may include a processor, microprocessor, or processing logic that may interpret and execute instructions. Memory 320 may include a random access memory (RAM) or another type of dynamic storage device that may store information and instructions for execution by processor 315. ROM 325 may include a ROM device or another type of static storage device that may store static information and instructions for use by processor 315. Storage device 330 may include a magnetic and/or optical recording medium and its corresponding drive.

Input device(s) 335 may include one or more mechanisms that permit an operator to input information to mobile device 300, such as, for example, a keypad or a keyboard, a microphone, voice recognition, components for a touchscreen, and/or biometric mechanisms, etc. Output device(s) 340 may include one or more mechanisms that output information to the operator, including a display, a speaker, etc. Communication interface 345 may include any transceiver mechanism that enables mobile device 105 to communicate with other devices and/or systems. For example, communication interface 345 may include mechanisms for communicating with another device or system via a network, such as wireless network 300.

Secure Element (SE) 355 may be inserted into a secure element interface (I/F) (e.g., a smart card or Subscriber Identifier Module (SIM) card interface) of mobile device 300. SE 355 is a tamper-resistant platform (e.g., a single-chip secure microcontroller) capable of securely hosting applications and their associated confidential and/or cryptographic data (e.g., key management) in accordance with the rules and security requirements set forth by a set of trusted authorities. SE 355 may securely store applications and data to permit mobile device 300 to perform trusted exchanges with other network entities. The secure information stored in SE 355 may be managed in accordance with rules and security requirements provided by established trusted authorities. SE 355 may provide the security and confidentiality required to perform validation of a user's identity to the network 100. SE 355 may include, for example, a Universal Integrated Circuit Card (UICC), a removable user identity card (R-UIM), a subscriber identity module (SIM), a universal subscriber identity module (USIM), or an Internet Protocol (IP) multimedia services identity module (ISIM).

Mobile device 300 may perform certain operations or processes, as may be described in detail below. Mobile device 300 may perform these operations in response to processor 315 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into memory 320 from another computer-readable medium, such as storage device 330, or from another device via communication interface 345. The software instructions contained in memory 320 may cause processor 315 to perform operations or processes that will be described in detail with respect to FIG. 9. Alternatively, hardwired circuitry may be used in place of or in combination with software instructions to implement processes consistent with the principles of the embodiments. Thus, exemplary implementations are not limited to any specific combination of hardware circuitry and software.

The configuration of components of mobile device 300 illustrated in FIG. 3 is for illustrative purposes only. It should be understood that other configurations may be implemented. Therefore, mobile device 300 may include additional, fewer and/or different components than those depicted in FIG. 3.

Figure 4:
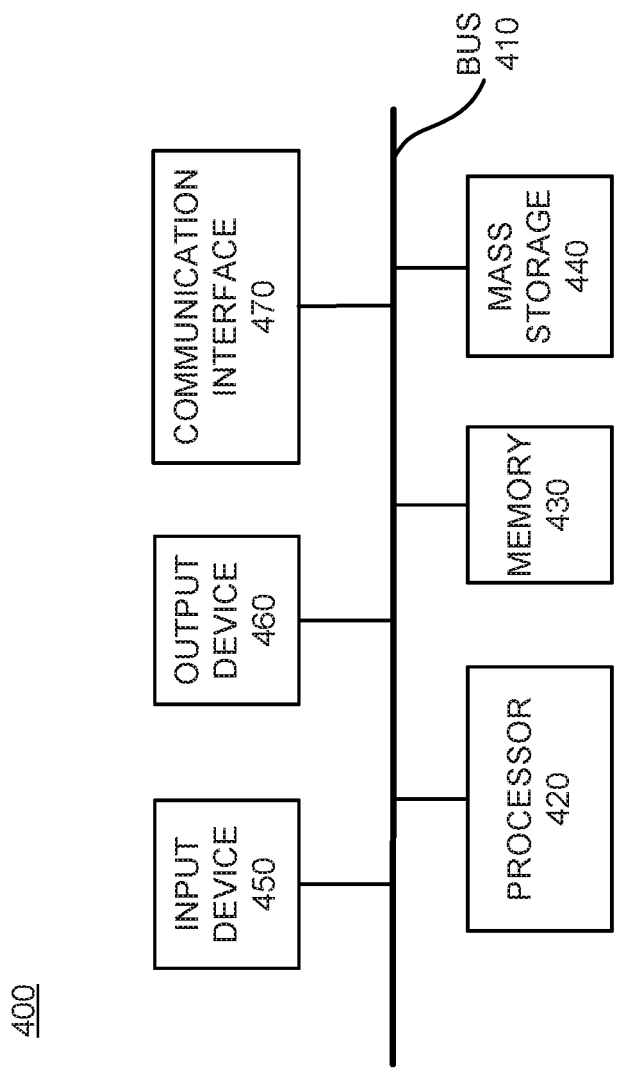
FIG. 4 is a block diagram showing exemplary components of a server according to an embodiment.

FIG. 4 is a block diagram showing exemplary components of a network element 400, such as, for example, a PCRF 116, according to an embodiment. Network element 400 may include a bus 410, a processor 420, a memory 430, mass storage 440, an input device 450, an output device 460, and a communication interface 470.

Bus 410 includes a path that permits communication among the components of network element 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux. Processor 420 may also use high-level analysis software packages and/or custom software written in any programming and/or scripting languages for interacting with other network entities are communicatively coupled to network 100.

Memory 430 may include any type of dynamic storage device that may store information and/or instructions, for execution by processor 420, and/or any type of non-volatile storage device that may store information for use by processor 420. For example, memory 430 may include a RAM or another type of dynamic storage device, a ROM device or another type of static storage device, and/or a removable form of memory, such as a flash memory. Mass storage device 440 may include any type of on-board device suitable for storing large amounts of data, and may include one or more hard drives, solid state drives, and/or various types of (RAID) arrays. For an advertising server, mass storage device 440 would be suitable for storing files associated sponsor advertising content, databases storing information regarding non-subscription users receiving advertising content, access parameters for non-subscription users, and information which may be used for analytics.

Input device 450, which may be optional, can allow an operator to input information into network element 400, if required. Input device 450 may include, for example, a keyboard, a mouse, a pen, a microphone, a remote control, an audio capture device, an image and/or video capture device, a touch-screen display, and/or another type of input device. In some embodiments, network element 300 may be managed remotely and may not include input device 450. Output device 460 may output information to an operator of network element 400. Output device 460 may include a display (such as an LCD), a printer, a speaker, and/or another type of output device. In some embodiments, network element 400 may be managed remotely and may not include output device 460.

Communication interface 470 may include a transceiver that enables network element 400 to communicate within network 100 with other devices and/or systems. The communications interface 470 may be configured for wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 470 may include a transmitter that converts baseband signals to RF signals and/or a receiver that converts RF signals to baseband signals. Communication interface 470 may be coupled to one or more antennas for transmitting and receiving RF signals. Communication interface 470 may include a logical component that includes input and/or output ports, input and/or output systems, and/or other input and output components that facilitate the transmission/reception of data to/from other devices. For example, communication interface 470 may include a network interface card (e.g., Ethernet card) for wired communications and/or a wireless network interface (e.g., a WiFi) card for wireless communications. Communication interface 470 may also include a universal serial bus (USB) port for communications over a cable, a Bluetooth® wireless interface, an RFID interface, an NFC wireless interface, and/or any other type of interface that converts data from one form to another form.

As described below, network element 400 may perform certain operations relating to server (e.g., PCRF, MME) and/or gateway operations when embodied as a gateway (e.g., SGW 112 and/or PGW 114), and/or providing user subscription and service information when embodied as an HSS 120. Network element 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein, such as, for example, process 700 depicted in FIG. 7. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of network element 400, in other implementations, network element 400 may include fewer components, different components, additional components, or differently arranged components than depicted in FIG. 4.

Figure 5A:
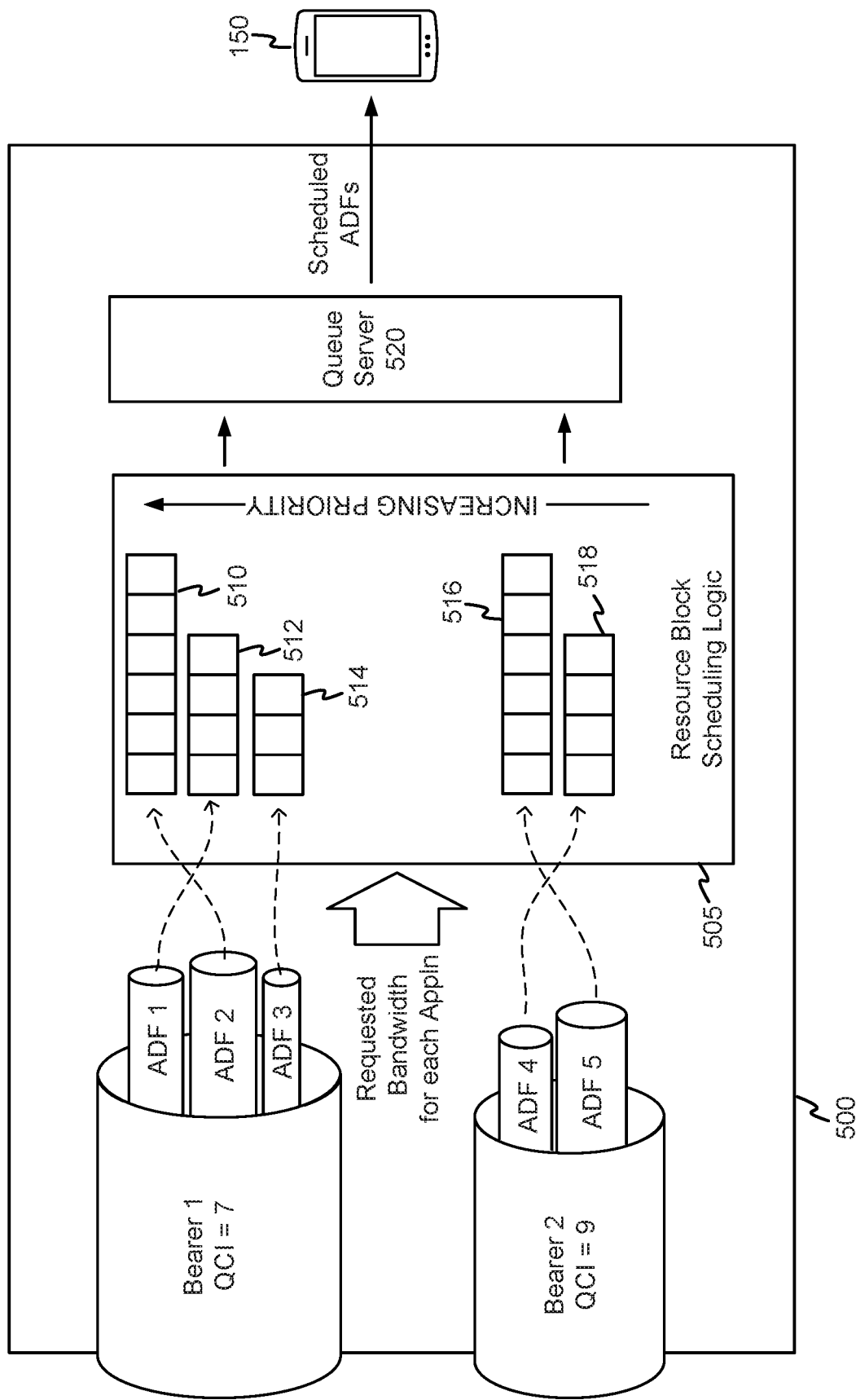
FIG. 5A is a block diagram illustrating the operation of an exemplary scheduler which allocates resources based on requested bandwidth.

FIG. 5A is a block diagram illustrating the operation of an exemplary scheduler 500 which allocates resources based on requested bandwidth. The embodiment illustrated in FIG. 5A schedules resource blocks within a single bearer for a given mobile device (e.g., UE 150). Scheduler 500 may reside in a base station (e.g., eNodeB 140) and schedule resource blocks for downlink transmissions to one or more mobile devices over a wireless channel. Scheduler 500 may include resource block scheduling logic 505 and Queue Server 520. These functional blocks may be implemented in software which executes on a processor (e.g., processing unit 210), or using dedicated hardware, or a combination thereof.

In an embodiment, a resource block may be a data structure that can be subdivided into resource elements which are organized in terms of both time and frequency. Each resource element may represent one orthogonal frequency division multiplexed (OFDM) sub-carrier during one OFDM symbol interval, where a symbol in each resource element represents a pre-defined number of bits based upon their symbol modulation (e.g., QPSK, 16-QAM, 64-QAM, etc.). The information density of a resource block can depend upon the attributes of the wireless channel. For example, under channel conditions having high signal-to-noise ratio, each of the symbols in the resource blocks will represent more bits-per-symbol. Thus, the information density within each resource block increases as wireless channel conditions improve. The information density may be reflected in a parameter referred to as the Modulation Coding Scheme (MCS) value which may be determined by eNodeB 140 using, for example, estimates of wireless channel conditions based on pilot signals exchanged with the UE 150. Moreover, as bandwidth of the wireless channel increases, more resource blocks may be sent over the downlink to UE 150.

According to an embodiment, LTE provides standards outlining how to provide transmission paths between UE 150 and wide area network 160 with well-defined QoS. This may be established using a "bearer model," where a bearer is a basic traffic separation element that enables different treatment for traffic with differing QoS requirements. Bearers can provide logical, edge-to-edge transmission paths with defined a QoS between UE 150 and PGW 114. Each bearer may be associated with a set of QoS parameters that describe properties of the transport channel, including packet delays, bit rates, packet loss, bit error rate, and scheduling policy in eNodeB 140. A bearer may support multiple Application Data Flows (ADFs) which have a common QoS parameters, but can have different bandwidth requirements. A bearer may have a number of different QoS parameters which vary depending upon whether the bearer supports a real-time (e.g., GBR) or a best effort service (e.g., non-GBR). The parameters for non-GBR bearers may include QoS Class Indicator (QCI) and Allocation and Retention Priority (ARP). The QCI may specify the treatment of packets received on a specific bearer. Packet forwarding of traffic traversing a bearer is handled by each network element (e.g., PGW 114, SGW 112, eNodeB 140). QCI values are standardized into a number of different types, and can impact non-specific parameters, such as link layer configuration, scheduling, and queue management. LTE networks have the ability to drop or downgrade lower-priority bearers in situations where the network becomes congested. Each bearer may have an associated allocation and retention priority (ARP) which may be used in bearer establishment, and which may become relevant during handoff situations when UE 150 transitions over to another eNodeB. The network may use ARP when determining whether to establish new dedicated bearers.

Scheduler 500 shows two different bearers, Bearer 1 and Bearer 2, which support multiple application data flows for a single UE 150. Bearer 1, which has a QCI value of 7, has higher priority than Bearer 2, which has a QCI value of 9. Accordingly, based on conventional QoS techniques, the Application Data Flows (ADFs) in Bearer 1 (ADF 1, ADF 2, and ADF 3) will have greater priority than the ADFs being serviced by Bearer 2 (ADF 4 and ADF 5). However, with conventional scheduling, ADFs within a single bearer are not scheduled according to each ADF's resource requirements (e.g., bandwidth), thus some ADFs, such as those with higher bandwidth requirements, may not receive the resources required for the proper operation of their associated applications.

Further referring to FIG. 5A, according to one embodiment, finer granularity prioritization within each bearer may be performed by scheduler 500 based on the requested bandwidth associated with each ADF within that bearer. As shown in FIG. 5A, the requested bandwidth for each ADF is pictorially represented as being proportional to the thickness of the "tubes" representing each ADF. The actual requested bandwidth values are provided to resource block scheduling logic 505, along with the each ADF from both Bearer 1 and Bearer 2. Accordingly, ADF 2 has a higher requested bandwidth than ADF 1, and ADF 1 has a higher requested bandwidth than ADF 3. Thus, resource block scheduling logic 505 will take into account the requested bandwidth for each ADF within Bearer 1, and assign higher priorities to ADFs requesting more bandwidth. So for example, for ADF 2, resource block scheduling logic 505 will allocate the largest amount of resources blocks 510. For ADF 1, resource block scheduling logic 505 will allocate the second largest number of resource blocks 512. ADF 3, having the lowest requested bandwidth, will receive the smallest number of resource blocks 514. For Bearer 2, ADF 5 will be allocated the larger portion of resource blocks 516, and ADF 4 will be allocated the smaller portion of resource blocks 518. For this embodiment, the allocation of resource blocks based on requested bandwidth is scheduled within each bearer. That is, each bearer will have a certain number of resource blocks allocated to it based on the bearer's QCI value. Resource block scheduling logic 505 refines the allocation of resource blocks allocated to each bearer over each ADF based on the requested bandwidth for each application. The embodiment thus provides "application fairness" across each bearer for each UE that has a wireless channel established with eNodeB 140. Once each bearer's ADFs are allocated resources based on requested bandwidth, the resource block scheduling logic 505 may provide the scheduled resource blocks to Queue Server 520 where they are buffered and appropriately scheduled based on their QCI into prioritized application data streams for transmission over the wireless channel to UE 150.

In another embodiment, if the resource block scheduling logic 505 determines there are not enough resource blocks to properly allocate to an ADF which has high bandwidth requirements, the scheduler may choose to service lower priority ADFs first to get them out of the queue, and then try to service the ADF having high bandwidth requirements once an adequate number of resource blocks become available.

Figure 5B:
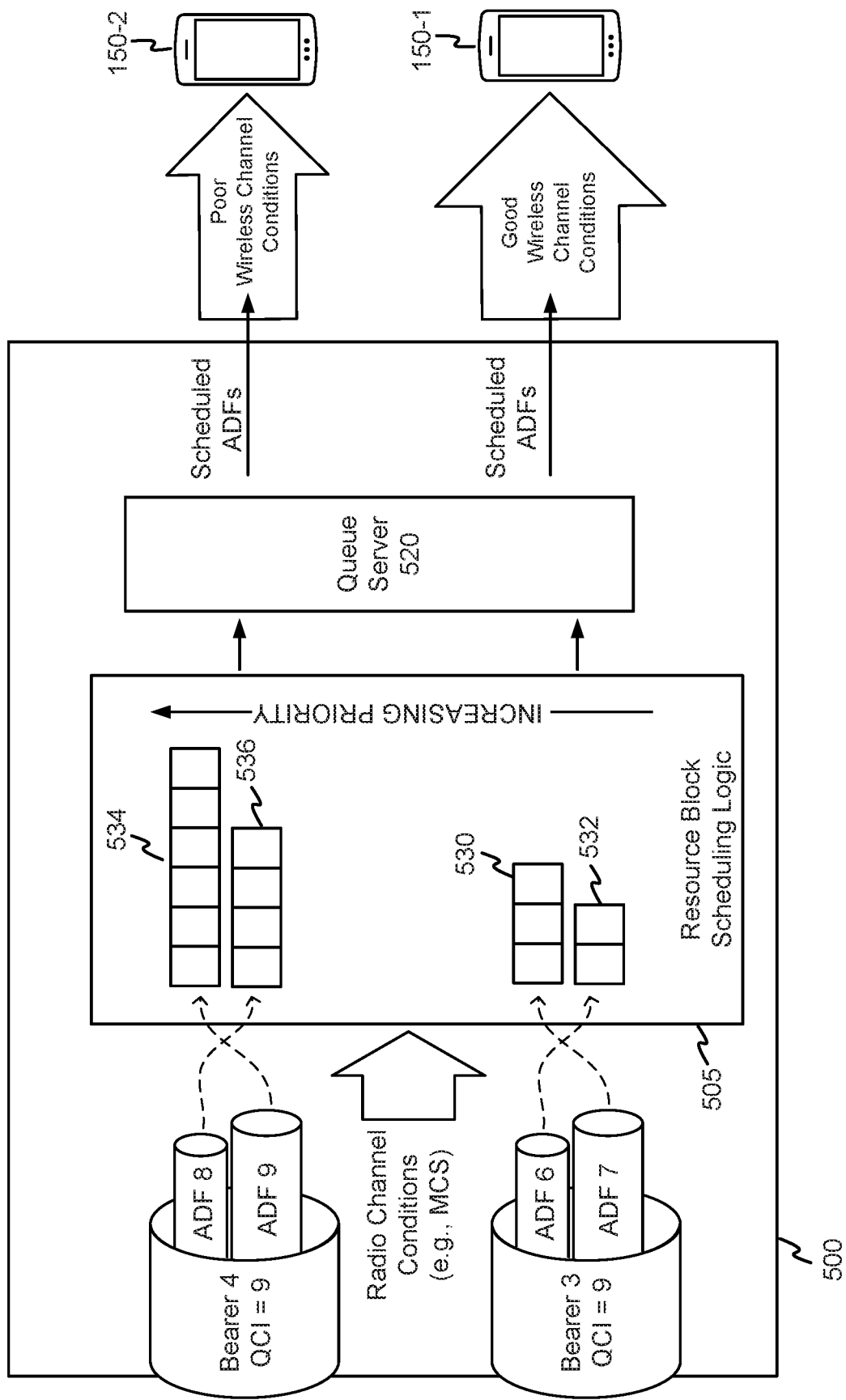
FIG. 5B is a block diagram illustrating the operation of an exemplary scheduler which allocates resources based on wireless channel conditions.

FIG. 5B is a block diagram illustrating the operation of an exemplary scheduler 500 which allocates resources based wireless channel conditions. The wireless conditions may be empirically determined by the eNodeB 140, which may be used to set a Modulation Coding Scheme (MCS) for determining the symbol coding density of the application data flows. Accordingly, in an embodiment, the MCS values may be used to infer the quality of the wireless channel.

In this embodiment, resource block scheduling logic 505 may allocate blocks differently across two different UEs 150-1, 150-2, based on the quality of their respective wireless channels to eNodeB 140. Therefore, in this embodiment, the resource blocks across different UEs 150 may be allocated differently even if the ADFs for each UE are assigned to bearers have the same QCI value. For example, as shown in FIG. 5B, Bearer 3 has a QCI value of 9, and supports ADF 6 and ADF 7, where ADF 7 has a higher requested bandwidth than ADF 6. Accordingly, with respect to Bearer 3, ADF 7 will be prioritized above ADF 6, and thus be allocated with more resource blocks 530. ADF 6 will be allocated with lesser priority using fewer resource blocks 532. Similarly, Bearer 4 has a QCI value of 9, and supports ADF 8 and ADF 9, where ADF 9 has a higher requested bandwidth than ADF 8. Thus, with respect to Bearer 4, ADF 9 will be prioritized above ADF 8, and therefore be allocated with more resource blocks 534. ADF 8 will be allocated with lower priority using fewer resource blocks 536.

In an embodiment, resource blocks may be scheduled differently among the different UEs 150-1, 150-2, even though Bearer 3 and Bearer 4 have the same QCI value. In one embodiment, more blocks will be allocated to the ADFs associated with the UE having poorer channel conditions (e.g., UE 150-2), and less blocks will be allocated to the ADFs associated with the UE (e.g., UE 150-1) having better channel conditions. As noted above, the information density of resource blocks will vary depending upon the wireless channel conditions associated with each UE. For good wireless conditions, more bits may be transferred in each resource block than when wireless conditions are bad. Thus, in order to promote fairness among applications across different UEs 150 having varied wireless channel conditions, the number of resource blocks allocated to ADFs can vary based on the quality of the wireless channel between UEs 150 and eNodeB 140.

For example, as can be seen in FIG. 5B, ADF 9, which is associated with UE 150-2 having poor wireless channel conditions, is allocated more resource blocks 534 than ADF 7. ADF 7 is allocated fewer resource blocks 530 because UE 150-1 is associated with good wireless channel conditions. The difference in the number of blocks can be based on the differences in information density, and the blocks can be allocated so that the number of bits transferred for each UE 150 is approximately the same. The MCS may be used as an indicator of the quality of the wireless channel, since the MCS can be determined at eNodeB 114 through analyzing pilot signals transmitted by each UE 150-1, 150-2. Once resource block scheduling logic 505 allocates the resource blocks for the ADFs in Bearer 3 and Bearer 4, the ADFs may then be provided to Queue Server 520 so the allocated resources blocks may be scheduled for subsequent transmission to each UE 150 over the downlink wireless channel.

FIG. 6 is a signal flow diagram depicting exemplary messages exchanged between various networking entities in network 100. In an embodiment, UE 150 may initially launch an application (612) which requests an application data flow from one or more content providers 170. UE 150 may then send a connection request to PCRF 116 (602), which includes an application category and a requested bandwidth. The connection request may pass through eNodeB 140, Serving Gateway 112, and PDN Gateway 114 before arriving at PCRF 116. The requested bandwidth may be a minimum bandwidth of the application data flow that is required for proper execution of the application. The application category may, for example, identify the application to PCRF 116 for determining QoS prioritization (e.g., determine a QCI value). This can be accomplished by providing information which is commonly referred to as the "5-tuple." The 5-tuple may include: the source IP address, the destination IP address, the source port number, the destination port number, and the protocol information of the application data stream.

Based upon the 5-tuple and using available network information and/or operator configured policies, PCRF 116 may determine a policy for the application data flow associated with the application (614). For example, the policy may further include QCI configuration information which may be pre-provisioned in PCRF 116 (e.g., by one or more content providers and/or a network operator). In one implementation, the QCI configuration information may define priorities associated with subscribers of the IP wireless access network. For example, the QCI configuration information may include information associated with subscribers (e.g., users of UEs 150) of content provider(s) 170 and/or data services providers. For example, the QCI configuration information may include, for each application and/or subscriber, a particular QCI value.

Once the policy is determined by PCRF 116, the policy for the application data flow may be provided to PDN Gateway 114 (604). PDN Gateway 114 may map the application data flow to a particular bearer based on the determined policy, and further provide a bandwidth designation based on the requested bandwidth (616). As noted above with regards to FIGS. 5A and 5B, the bearer can be associated with a particular QCI value, and carry multiple application data flows. PDN Gateway 114 may send a Bearer ID and the bandwidth designation to MME 118 through Serving Gateway 112 (606). MME 118 may provide a UE ID, along with the Bearer ID and a Socket Connection to eNodeB 140 (607). In an embodiment, the Socket Connection may be based on bandwidth designation, and thus be associated with a particular bandwidth for the application data flow within the bearer designated by the Bearer ID. In addition, eNodeB 140 may receive the application data flow from PDN Gateway 114 through Serving Gateway 112 (608). Using the received information, eNodeB 140 may schedule resource blocks based on both the Bearer ID and the Socket Connection which is indicative of the requested bandwidth. As will be described in more detail below in regards to FIG. 8, for application data flows within the bearer associated with the Bearer ID, eNodeB 140 will provide finer granularity QoS prioritization based on the requested bandwidth for each application data flow in the bearer associated with the Bearer ID. UE 150 may receive the scheduled application data flows from eNodeB 140 (610).

Figure 7:
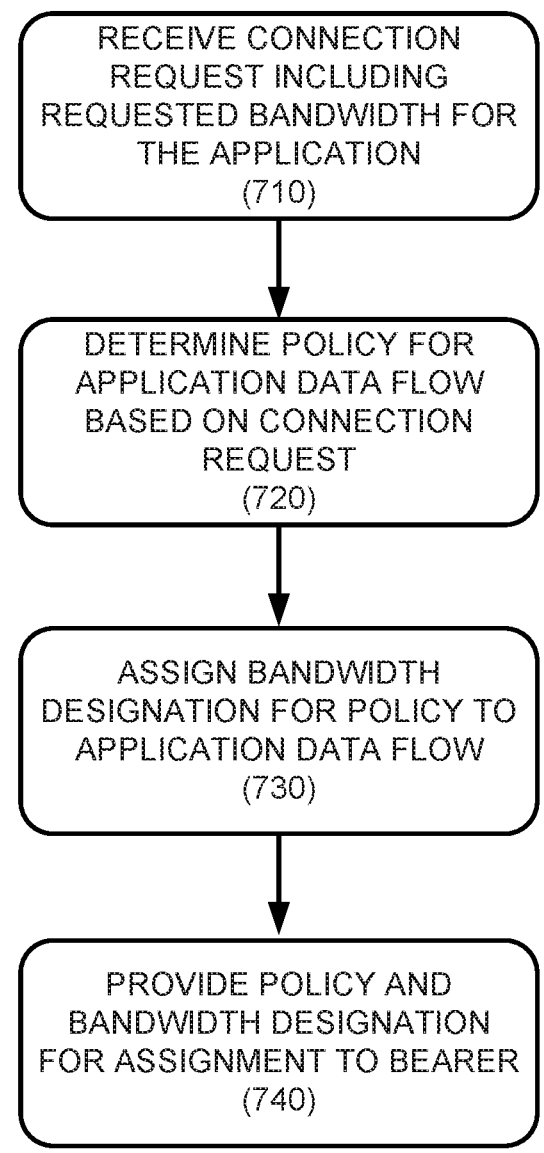
FIG. 7 is a flow chart showing an exemplary process for providing a QoS policy based on bandwidth.

FIG. 7 is a flow chart showing an exemplary process 700 for providing a Quality of Service (QoS) policy based on bandwidth. Process 700 may be performed on a network device, such as a server or a PCRF 116. The network device may initially receive a connection request which may include a requested bandwidth for an application launched by UE 150 (710). In an embodiment, the connection request may occur during an attachment procedure. The requested bandwidth may include a minimum bandwidth required for the operation of the application. The connection request may also include an application category which may be specified as a 5-tuple as noted above in regards to the description of FIG. 6. The 5-tuple may include a source Internet Protocol (IP) address, a destination IP address, a source port number, a destination port number, and a protocol identification.

The network device may determine a policy for an application data flow associated with the application based on the connection request (720). The policy may include a QoS Class Indicator (QCI) which is based upon at least one of a profile of the application or a subscription profile associated with a mobile device which hosts the application.

The network device may assign a bandwidth designation for the determined policy to the application data flow (730), where the bandwidth designation may be based on the requested bandwidth. In an embodiment, the bandwidth designation may include a designation and/or assignment of a socket connection within a bearer. The network device may then provide the policy and the bandwidth designation for assignment to a bearer (740). The policy and bandwidth designation may be provided to a Policy and Charging Enforcement Function (PCEF) within PGW 114.

Figure 8:
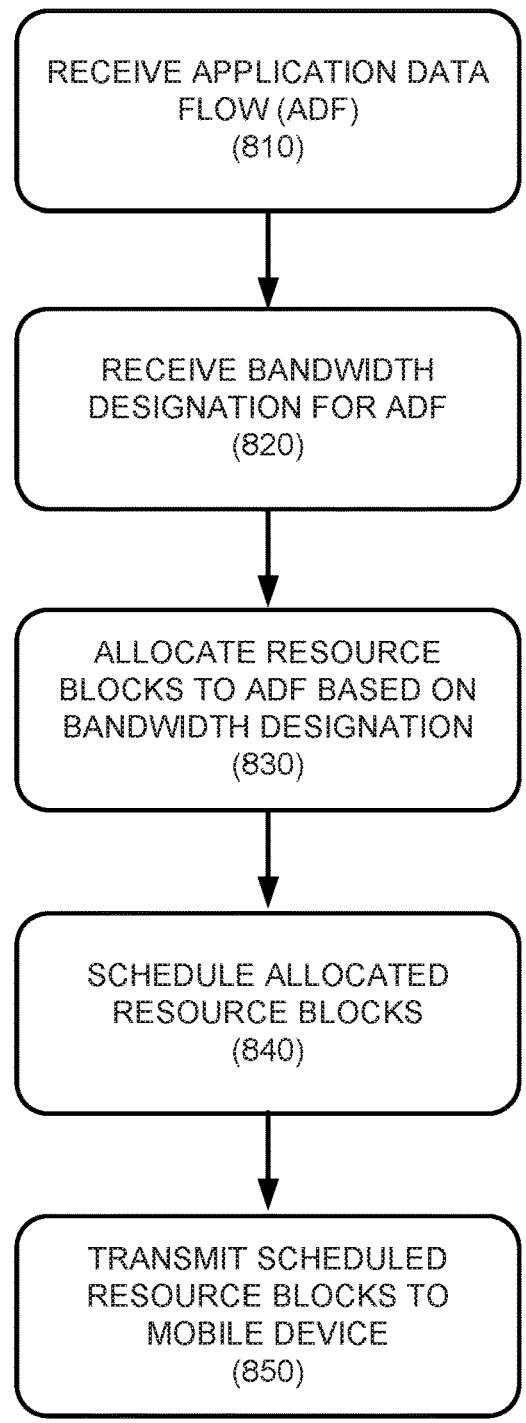
FIG. 8 is a flow chart showing an exemplary process for QoS resource allocation based on bandwidth.

FIG. 8 is a flow chart showing an exemplary process 800 for Quality of Service (QoS) resource allocation based on bandwidth. Process 800 may be performed by a base station, such as, for example, an eNodeB 140. In an embodiment, an eNodeB 140 may initially receive an Application Data Flow (ADF) (810). The ADF may originate at one or more content providers 170, and can be provided by PGW 114 in wireless network 105. The ADF is provided in response to a request by an application operating on a mobile device 150. ENodeB 140 may then receive a bandwidth designation associated with the application data flow (820). In an embodiment, the bandwidth designation may be provided as a socket in a bearer. ENodeB 140 may allocate resource blocks to the application data flow, where the allocation may be based on the bandwidth designation (830). The allocation may be performed by scheduler 500. The bandwidth designation may be a minimum bandwidth required for operation of the application. ENodeB 140 may schedule the allocated resource blocks (840), and then transmit the scheduled resource blocks to a UE 150 (850).

In an embodiment, eNodeB 140 may utilize information regarding a wireless channel condition for the UE 150 associated with the application, and allocate resource blocks based on the wireless channel condition. For example, the Modulation Coding Scheme (MCS) may be used as an indicator of the quality of the wireless channel, since the MCS can be determined at eNodeB 114 through analyzing pilot signals transmitted by each UE 150. The difference in the number of blocks can be based on the differences in information density, and the blocks can be allocated so that the number of bits transferred for each UE 150 is approximately the same.

Figure 9:
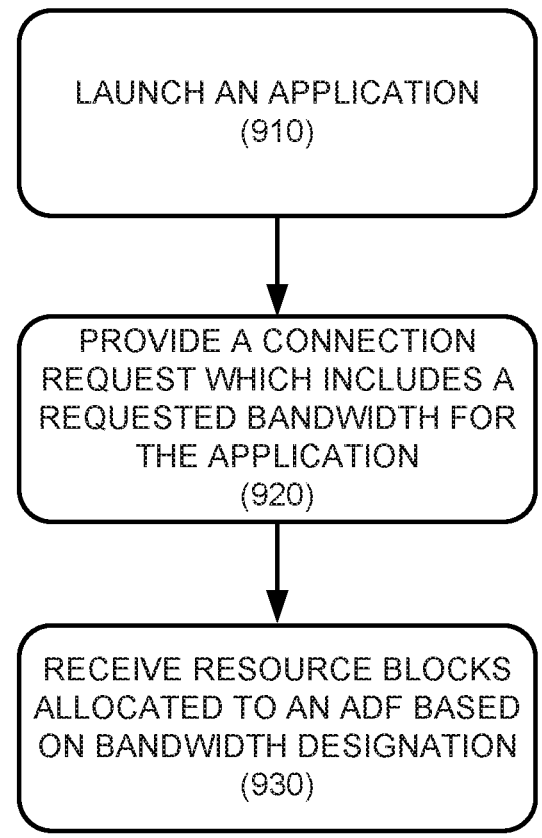
FIG. 9 is a flowchart showing an exemplary process for receiving resource blocks allocated based on bandwidth.

FIG. 9 is a flowchart showing an exemplary process 900 for receiving resource blocks allocated based on bandwidth. In an embodiment, process 900 may be performed within a UE 150, and starts when UE 150 launches an application (910). The application may require data from one or more content provider 170 over wide area network 160. Accordingly, UE 150 may provide a connection request which includes an application category and a requested bandwidth (920). The application category may be provided as a 5-tuple as described above in regards to FIG. 6. The requested bandwidth may be a minimum bandwidth required for proper operation of the launched application. The UE 150 may receive allocated resource blocks from eNodeB 140 which may be allocated to an Application Data Flow (ADF) based on a bandwidth designation (930). The bandwidth designation may be based on the requested bandwidth. In one embodiment, the bandwidth designation may include a socket within a bearer having a prescribed bandwidth.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6-9, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A method, comprising:
receiving, at a base station, an application data flow associated with a mobile device;
receiving, at the base station, a bandwidth designation for the application data flow;
analyzing, at the base station, a pilot signal transmitted by the mobile device to determine a wireless channel condition associated with the mobile device;
allocating, at the base station, resource blocks to the application data flow for transmission on a downlink wireless channel based on the wireless channel condition and the bandwidth designation for the application data flow, wherein the allocating is based on differences in information density within the resource blocks, so that a number of bits transferred across the wireless channel is approximately the same over varying wireless channel conditions;

scheduling, at the base station, the allocated resource blocks for transmission on the downlink wireless channel; and transmitting, from the base station, the scheduled resource blocks to the mobile device.

2. The method of claim 1, wherein allocating resource blocks based on the wireless channel condition further comprises:
increasing a number of resource blocks allocated when the wireless channel condition has declined, and decreasing the number of resource blocks allocated when the wireless channel condition has improved.

3. The method of claim 1, wherein analyzing the pilot signal further comprises:
ascertaining a modulation coding scheme for the mobile device.

4. The method of claim 3, wherein ascertaining the modulation coding scheme comprises:
determining a symbol coding density of the application data flow.

5. The method of claim 1, wherein the bandwidth designation comprises a socket within a bearer having a designated bandwidth.

6. The method of claim 5, wherein the socket is associated with a particular bandwidth for the application data flow within the bearer designated by a bearer identifier.

7. The method of claim 1, further comprising:
determining a symbol coding density of the application data flow; and
assigning a socket within a bearer having designated bandwidth based on the application data flow.

8. A base station, comprising:
a radio frequency interface configured to communicate over a wireless channel;
an interface configured to communicate with a network;
a memory configured to store instructions; and
a processor, coupled to the radio frequency interface, the interface, and the memory, wherein the processor is configured to execute the instructions stored in the memory to:
receive an application data flow associated with a mobile device;
receive a bandwidth designation for the application data flow;
analyze a pilot signal transmitted by the mobile device to determine a wireless channel condition associated with the mobile device;
allocate resource blocks to the application data flow for transmission on a downlink wireless channel based on the wireless channel condition and the bandwidth designation for the application data flow, wherein the resource blocks are allocated based on differences in information density within the resource blocks, so that a number of bits transferred across the wireless channel is approximately the same over varying wireless channel conditions;
schedule the allocated resource blocks for transmission on the downlink wireless channel; and
transmit the scheduled resource blocks to the mobile device.

9. The base station of claim 8, wherein the instructions to allocate resource blocks based on wireless channel condition further cause the processor to:
increase a number of resource blocks allocated when the wireless channel condition has declined, and decrease a number of resource blocks allocated when the wireless channel condition has improved.

10. The base station of claim 8, wherein the instructions to analyze a pilot signal further cause the processor to:
ascertain a modulation coding scheme for the mobile device.

11. The base station of claim 10, wherein the instructions to ascertain the modulation coding scheme further cause the processor to:
determine a symbol coding density of the application data flow.

12. The base station of claim 8, wherein the bandwidth designation comprises a socket within a bearer having a designated bandwidth.

13. The base station of claim 12, wherein the socket is associated with a particular bandwidth for the application data flow within the bearer designated by a bearer identifier.

14. The base station of claim 8, wherein the instructions further cause the processor to:
determine a symbol coding density of the application data flow; and
assign a socket within a bearer having designated bandwidth based on the application data flow.

15. A non-transitory computer-readable medium comprising instructions, which, when executed by a processor, cause the processor to:
receive an application data flow associated with a mobile device;
receive a bandwidth designation for the application data flow;
analyze a pilot signal transmitted by the mobile device to determine a wireless channel condition associated with the mobile device;
allocate resource blocks to the application data flow for transmission on a downlink wireless channel based on the wireless channel condition and the bandwidth designation for the application data flow, wherein the resource blocks are allocated based on differences in information density within the resource blocks, so that a number of bits transferred across the wireless channel is approximately the same over varying wireless channel conditions;
schedule the allocated resource blocks for transmission on the downlink wireless channel; and
transmit the scheduled resource blocks to the mobile device.

16. The non-transitory computer-readable medium of claim 15, wherein the instructions to allocate resource blocks based on wireless channel condition further cause the processor to:
increase a number of resource blocks allocated when the wireless channel condition has declined, and decrease the number of resource blocks allocated when the wireless channel condition has improved.

17. The non-transitory computer-readable medium of claim 15, wherein the instructions to analyze a pilot signal further cause the processor to:
ascertain a modulation coding scheme for the mobile device.

18. The non-transitory computer-readable medium of claim 17, wherein the instructions to ascertain the modulation coding scheme further cause the processor to:
determine a symbol coding density of the application data flow.

19. The non-transitory computer-readable medium of claim 15, wherein the bandwidth designation comprises a socket within a bearer having a designated bandwidth.

20. The non-transitory computer-readable medium of claim 15, wherein the instructions further cause the processor to:
    determine a symbol coding density of the application data flow; and
    assign a socket within a bearer having designated bandwidth based on the application data flow.

\* \* \* \* \*